United States Patent [19]
Pierson et al.

[11] Patent Number: 5,560,570
[45] Date of Patent: Oct. 1, 1996

[54] AUTOMATIC PILOTING DEVICE FOR AERODYNES

[75] Inventors: Benoit Pierson, Paris; Georges Guiol, Limours; Florence Limon, Gif sur Yvette, all of France

[73] Assignee: Sextant Avionique, Meudon la Foret, France

[21] Appl. No.: 255,718

[22] Filed: Jun. 7, 1994

[30] Foreign Application Priority Data

Jun. 7, 1993 [FR] France ................... 93 06864

[51] Int. Cl.⁶ .................. G05D 1/10; G05B 9/03
[52] U.S. Cl. ............... 244/195; 244/76 R; 244/194; 364/184; 364/186
[58] Field of Search .............. 244/75 R, 76 R, 244/175, 194, 195; 364/184, 187, 186

[56] References Cited

U.S. PATENT DOCUMENTS

| | | | |
|---|---|---|---|
| 4,115,847 | 9/1978 | Osder et al. | 364/101 |
| 4,464,227 | 2/1987 | Corbin et al. | 364/184 |
| 4,480,480 | 11/1984 | Scott et al. | 73/769 |
| 4,592,055 | 5/1986 | Fischer et al. | 244/194 |
| 4,594,537 | 6/1986 | Arifian et al. | 318/564 |
| 4,622,667 | 11/1986 | Yount | 364/184 |
| 4,634,110 | 1/1987 | Julich et al. | 364/187 |
| 4,799,159 | 1/1989 | Davidson et al. | 364/184 |
| 4,841,209 | 6/1989 | Poumakis | 364/184 |
| 5,408,645 | 4/1995 | Ikeda et al. | 395/575 |

FOREIGN PATENT DOCUMENTS

| | | |
|---|---|---|
| 0186965 | 7/1986 | European Pat. Off. . |
| 8400071 | 1/1984 | WIPO . |

*Primary Examiner*—Andres Kashnikow
*Assistant Examiner*—Virna Lissi Mojica
*Attorney, Agent, or Firm*—Browdy and Neimark

[57] ABSTRACT

The device embodying the invention uses at least one digital computer receiving information from a set of sensors and controlling actuators acting on the flight control surfaces, the computer comprising an autonomous means for monitoring the service quality thereof, for disconnecting the device and for recentering the actuators subsequent to detection of a failure. It applies notably to the automatic piloting of a helicopter.

18 Claims, 8 Drawing Sheets

AUTOMATIC PILOTING DEVICE FOR AERODYNES

BACKGROUND OF THE INVENTION

1. Field of the Invention

This invention relates to an automatic piloting device for an aerodyne such as e.g. a helicopter.

The purpose of such devices is generally to unburden the pilot of a certain number of tasks while improving the flight characteristics of the aerodyne which is usually unstable, and while performing certain piloting tasks such as the maintaining of the aerodyne on a certain trajectory selected by the pilot.

The aim of the automatic piloting devices intended to equip helicopters is more particularly to improve the stability of the aircraft during manual piloting, and to provide the pilot with an impression of greater stability and homogeneity as regards the characteristics of the effects of the different flight control surfaces.

2. Description of the Prior Art

Up to now, these devices carried out, for each of the three piloting axes (roll, pitch and yaw), an analog computation enabling controlling of the set of actuators acting on the flight control surfaces as a function of commands from the pilot and the information provided by the sensors.

Generally, the actuators for a piloting axis comprise a low-authority series thrustor with very fast motion, and a trim thrustor with full authority and slower motion, intended to recenter the position of the series thrustor.

When failure on a piloting axis entails fast and major movements of the helicopter, or when the mission entrusted to it requires considerable attention on the part of the crew, a redundant system is used to obtain the level of safety required. To this end, the computation sequence for each piloting axis is doubled and two actuators are installed in series on the rods of each flight control surface. In this way, if one of the two command sequences of a piloting axis breaks down, the other sequence counters it, and if the faulty command sequence is put out of operation, the mission can be continued.

This latter solution has the drawback of increasing the space requirements of the automatic piloting device and of multiplying the cost thereof.

Moreover, in a device using a digital computer controlling the piloting of several flight control axes, and in the event of failure thereof, the automatic piloting device is no longer operational for any of the piloting axes. This solution is therefore unacceptable in the context of certain missions and for certain types of helicopters.

In order to solve this problem, a second computer can be installed in parallel to the first one. In this way, if one of the computers breaks down, the other one continues the automatic piloting.

Should the required safety restrictions impose that the aircraft be equipped with an automatic piloting device capable of automatic reconfiguring, three computers operating in parallel can be used to determine the faulty computer and to perform automatic piloting functions in all circumstances.

These solutions also have the drawback of multiplying the cost of such a device.

OBJECT OF THE INVENTION

The main object of this invention is to remedy the preceding disadvantages, particularly to provide an automatic piloting device for an aerodyne, said device being sufficiently reliable in most cases for a considerably lower cost. This device uses a digital computer receiving information from a set of sensors and controlling actuators acting on the flight control surfaces.

SUMMARY OF THE INVENTION

Accordingly, the device is characterized in that the computer comprises an autonomous means for monitoring the service quality of the device, for disconnecting it and for recentering the actuators subsequent to detection of a failure.

By way of the speed of response of the digital systems, the actuators, and especially the series thrustors, can thus be quickly recentered subsequent to detection of a failure. This solution thus enables the effects of a failure to be reduced and safety criteria to be met accordingly.

According to a feature of the invention, the computer comprises at least one autonomous computing module with hardware and software resources comprising a means for ensuring piloting according to one of the three piloting axes, and a means for monitoring the service quality of the device, for disconnecting the latter and for recentering the actuators subsequent to detection of a failure.

According to another feature of the invention, the computer comprises at least two autonomous computing modules with hardware and software resources for respectively ensuring piloting according to any two of the three piloting axes, at least one of the two modules comprising a means for monitoring the piloting performed by the other module, for disconnecting it and recentering the actuators it controls, subsequent to detection of a failure. For this purpose, each computing module integrates the functions specific to each piloting axis, and disposes of a means for recognizing the piloting axes according to which it must ensure piloting and for which it must ensure monitoring.

As digital systems tend to centralize computing functions, this solution, which consists in using one computing module per piloting axis, is contrary to the prejudices of those skilled in the art. Furthermore, if one were to apply the conventional redundancy methods, this would lead to a multiplicity of high-power computers and therefore to costs that would be too high. The reasons for which these prejudices can be overcome are due to the fact that the drawback of using one computer per piloting axis, and therefore of lesser power, is well offset by the advantages derived from the flexibility of use and maintenance.

Furthermore, this modular approach enables the proposing of a configuration adapted to each type of helicopter and each type of certification, the minimum configuration comprising just one computing module which thus controls and monitors just one piloting axis.

Moreover, the monitoring means applies the same piloting laws as those used for piloting according to the monitored axis. The additional hardware and software resources required to produce this means are therefore very small.

According to a feature of the invention, each computing module integrates, on a single board, all the connectors enabling it to interface directly with the sensors and actuators, with no interconnection being provided between modules inside the box housing the modules. Each module thus integrates a power circuit enabling it to directly control the actuators.

By means of this configuration, testing and maintenance of the computer is limited to testing and maintenance of one single computing module.

Furthermore, certain actuators are equipped with a power control circuit, in which case computing modules must be provided without a power control circuit.

With a view to further improving the flexibility of adaptation and therefore of reducing the manufacturing and maintenance costs of such a computer, each computing module comprises at least one plug-in module grouping together the power control and I/O management circuits of the computing modules most likely to vary from one configuration to another.

All these arrangements enable the obtaining of an automatic piloting device that is simplified from the point of view of hardware, and therefore of considerably lower manufacturing and maintenance costs than the systems already proposed.

BRIEF DESCRIPTION OF THE DRAWINGS

Further features and advantages of the invention will be apparent from the an embodiment of the invention described, by way of a non-limiting example, in reference to the corresponding accompanying drawings in which.

DESCRIPTION OF THE PREFERRED EMBODIMENTS

Figure 1:
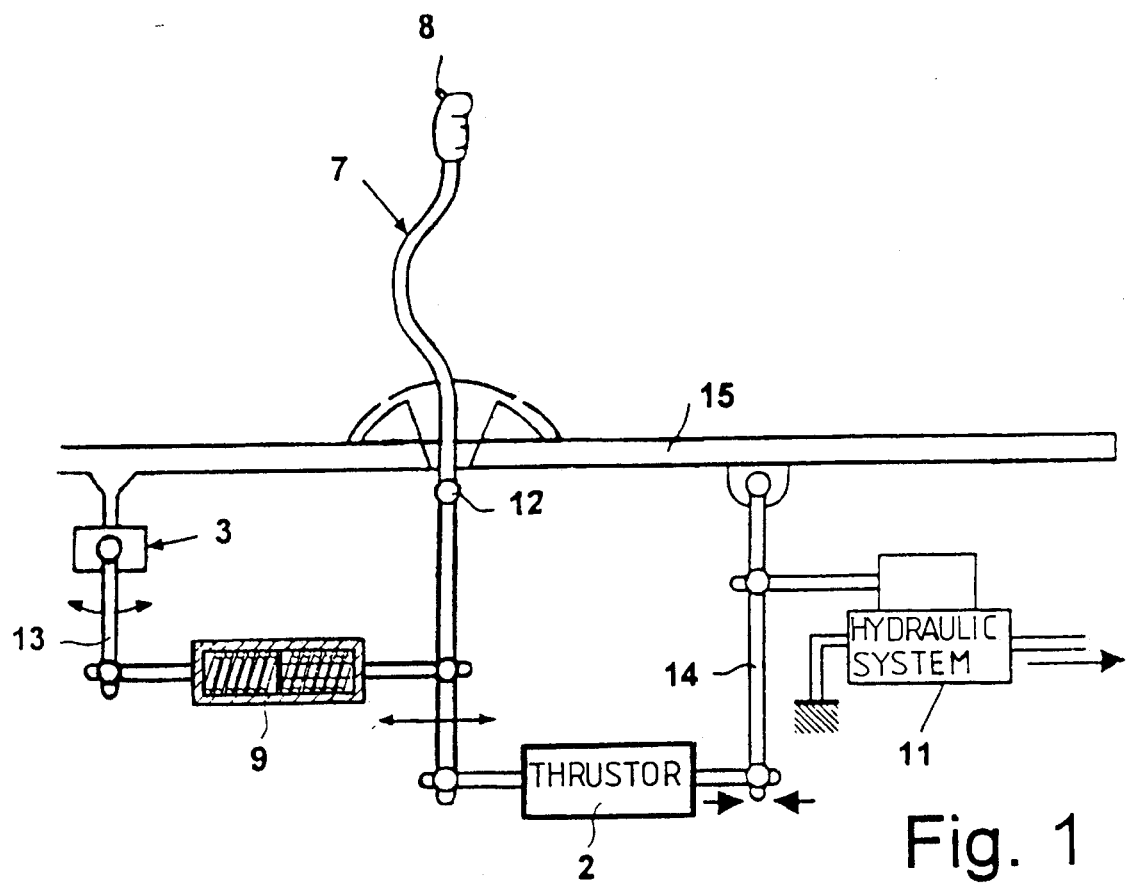
FIG. 1 schematically represents the automatic piloting device within an attitude control system according to one helicopter piloting axis.

FIG. 1 represents the different piloting elements according to one of the pitch or roll axes. These elements comprise a control column 7 which is activated by the pilot and extends through the floor 15 of the cockpit in order to pivot about an axis 12. The end opposite the control column 7 extends to form a lever acted on, on the one hand, by a device 9 intended to apply to the control column a resisting force complying with a predetermined law of exertion, and, on the other hand, by a series thrustor 2.

This device 9 comprises a fulcrum attached to a lever 13 operated by a trim thrustor and fixed to the floor 15.

The other end of the series thrustor 2 actuates another lever 14 which pivots about an axis interdependent with the floor 15. This lever 14 enables the hydraulic system 11 to be operated, said system acting directly on the flight control surfaces of the helicopter.

In this structure, the trim thrustor 3 is intended to slowly recenter, while offsetting all the rods, the position of the series thrustor 2 whose motion is very fast in order to bring it back to the neutral position and to restore its piloting authority to it.

Figure 2:
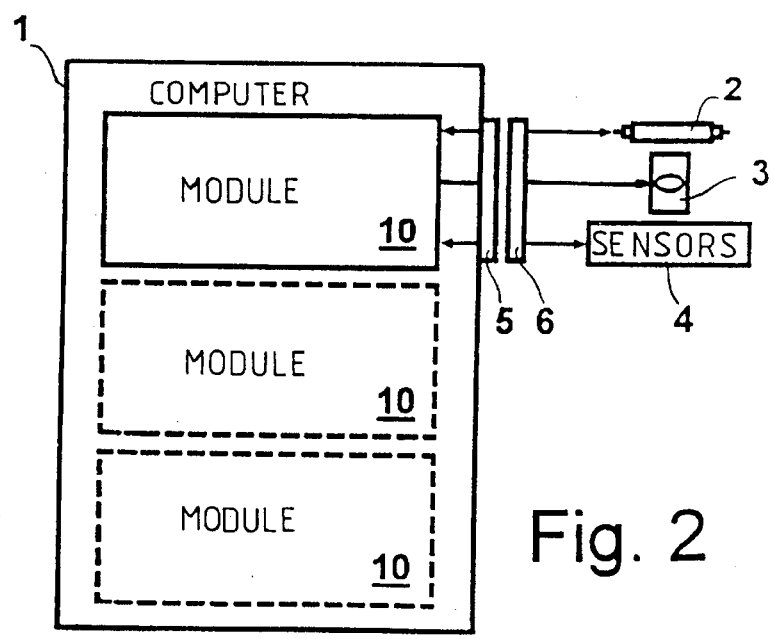
FIG. 2 schematically represents the hardware architecture of the computer connected to the actuators and set of sensors.

In FIG. 2, the computer 1 comprises a module 10 which exchanges information with a set 4 representing the sensors, the helicopter cockpit and possibly test equipment.

It is designed to take two other modules 10 (represented in broken lines) identical to the first one, enabling the two other piloting axes of the helicopter to be controlled.

The module 10 enables direct controlling of the series thrustor 2 and trim thrustor 3 of a piloting axis as a function of information coming from the set 4. For this purpose, it has a contact pin 5 which fits into a contact socket 6 bringing together all the ends of the electrical links from the sensors, actuators and cockpit.

This figure shows the minimum configuration provided by the automatic piloting device. According to this configuration, the computer 1 comprises a single module 10 dedicated to controlling the piloting according to the yaw axis.

This configuration notably enables yaw damping or automatic course holding as a function of the information from the available and connected sensors.

Figure 3:
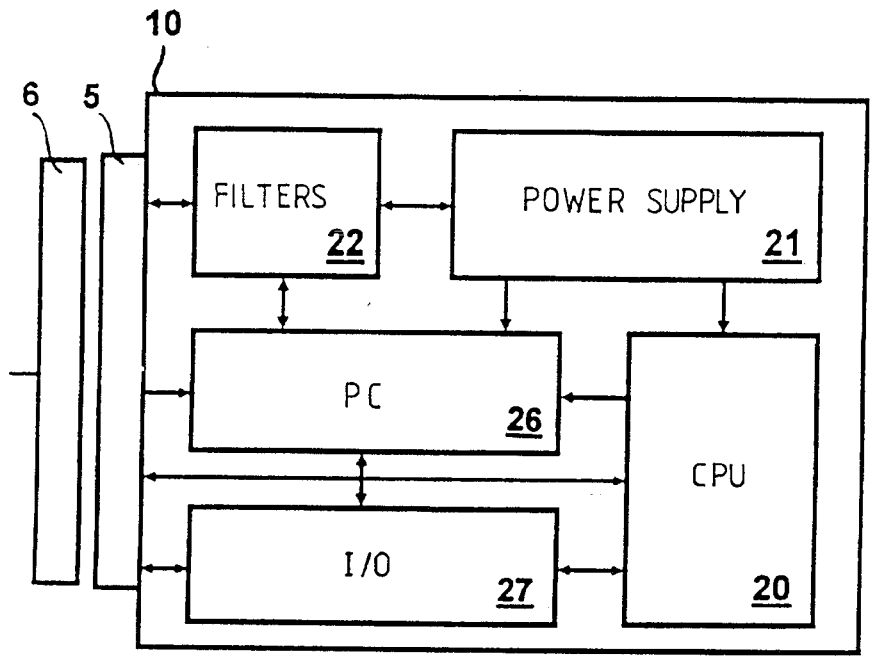
FIG. 3 schematically represents the hardware architecture of a module of the computer.

In FIG. 3, each computing module 10 comprises:

a digital heart 20 comprising notably a microprocessor and memories enabling a programme and data to be stored;

a data I/O management circuit 27, irrespective of whether said data are digital or analog data from or to other modules 10 of the computer 1 and other helicopter equipment;

a power control circuit 26 for the actuators of a piloting axis receiving, from the digital heart 20, the analog command instructions to be applied to the actuators of the piloting axis;

a feed circuit 21 enabling DC power to be supplied to the different circuits of the module 10;

a filtering and protection circuit 22 for protection of all the inputs and outputs of the module 10 against the effects of lightning and electromagnetic radiation; and a multiple socket contact connector 5 which cooperates with a contact pin 6 grouping together all the electrical links with the sensors 4, actuators 2, 3, and cockpit.

The I/O management circuit 27 can notably receive data from the other equipment in the helicopter, such as e.g. the vertical control unit, altimeters, navigational systems following radio navigation markers, or equipment measuring its speed with respect to the air. This information can be used by the digital heart 20 to perform high-level functions such as navigational functions.

The digital heart 20 communicates directly with the cockpit and test equipment via a series link. It has all the hardware and software resources to perform the following functions:

initialization of the module and programme, real-time scheduling and management of interruptions, management of the I/O ports, memory and loading of the programme, computation of the piloting instruction to be applied to the actuators to which it is connected, by means of the piloting laws for the axis under consideration, management of activation of the module 10 as a function of the status of the other modules 10 in the computer 1, monitoring of the other modules 10 of the computer 1 and of inhibition thereof in the event of failure, maintenance of the system and management of the tests to be conducted before and during each flight, and management of the series links enabling it to communicate with the test equipment and cockpit.

The instruction computing function also comprises high-level piloting functions such as e.g. navigational functions.

As the piloting laws to be implemented differ from one piloting axis to another, the instruction computing, monitoring and test functions include specific functions for each piloting axis. In order to determine which piloting laws to implement, each module 10 recognizes the piloting axis it must process and the one it must monitor according to the method of connection of the external connector 6 plugged into its connector 5. Thus, no particular manipulation is required to indicate, to each module 10, which piloting axis it must control.

For this purpose, this connector 6 comprises a set of idle connecting points which are used to enable each computing module 10 to recognize the piloting axis or axes to which it is connected, it order to be able to configure itself. The digital heart of each module 10 also has of a self-configuring function which triggers, when the module 10 is powered up, to test the interconnections between the points of this set at the level of the socket connector 6, each piloting axis corresponding to a specific plugging chart.

In order to ensure that two modules cannot be assigned to a same axis, the self-configuring function sets up a dialogue, between the modules 2a, 2b of the computer 1, during which each module transmits a code identifying the axis to which it is connected, and checks that no other module has transmitted the same code.

Figure 4:
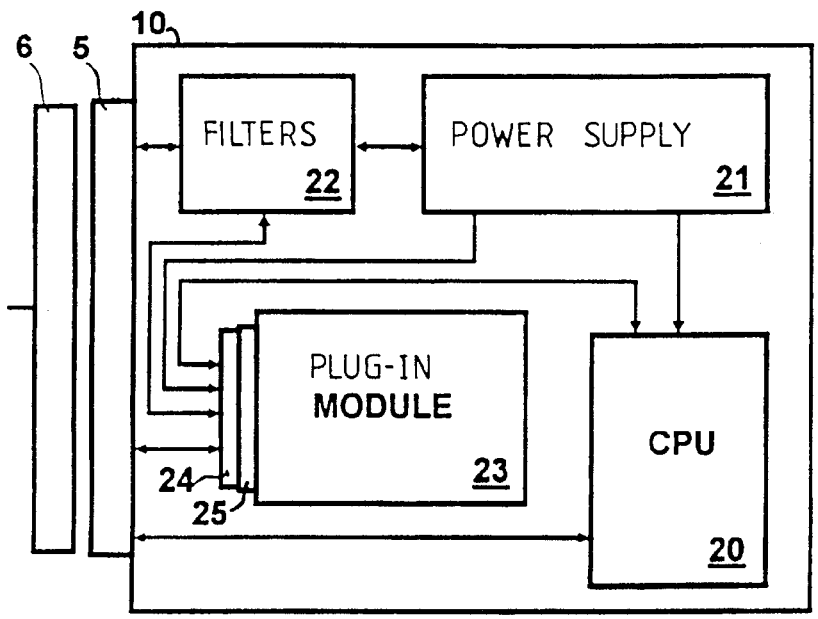
FIG. 4 shows a computing module provided with a plug-in module.

According to the embodiment represented in FIG. 4, the power control and I/O management circuits are grouped together in a plug-in module 23. To this end, each computing module 10 comprises a connector 24 intended to receive a connector 25 provided on the plug-in module 23.

Figure 5:
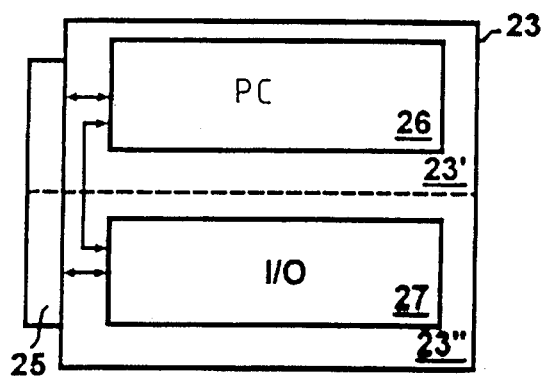
FIG. 5 schematically represents a plug-in module.

In FIG. 5, each plug-in module 23 comprises:
a data I/O management circuit 27, irrespective of whether said data are digital or analog data from or to other helicopter equipment, and possibly from or to the other computing modules 10 of the computer 1; and
a power control circuit 26 for the actuators of a piloting axis receiving the value of the position of the series thrustor, and, from the digital heart 20, the analog command instructions to be applied to the actuators of the piloting axis under consideration.

In order to further improve its flexibility of adaptation, the computing module 10 can receive two plug-in modules 23' and 23", one 23' of which includes the power control circuit 26, and the other 23" including the I/O management circuit 27.

In this way, if the actuators are fitted with their own power control circuit, the computing module only receives the plug-in module 23" including the I/O management circuit 27 adapted to this configuration.

The I/O management circuit 27 can notably receive data from the other equipment in the helicopter, such as e.g. the vertical control unit, altimeters, navigational systems following radio navigation markers, or equipment measuring its speed with respect to the air. This information can be used by the digital heart 20 to perform high-level functions such as e.g. navigational functions.

Figure 6:
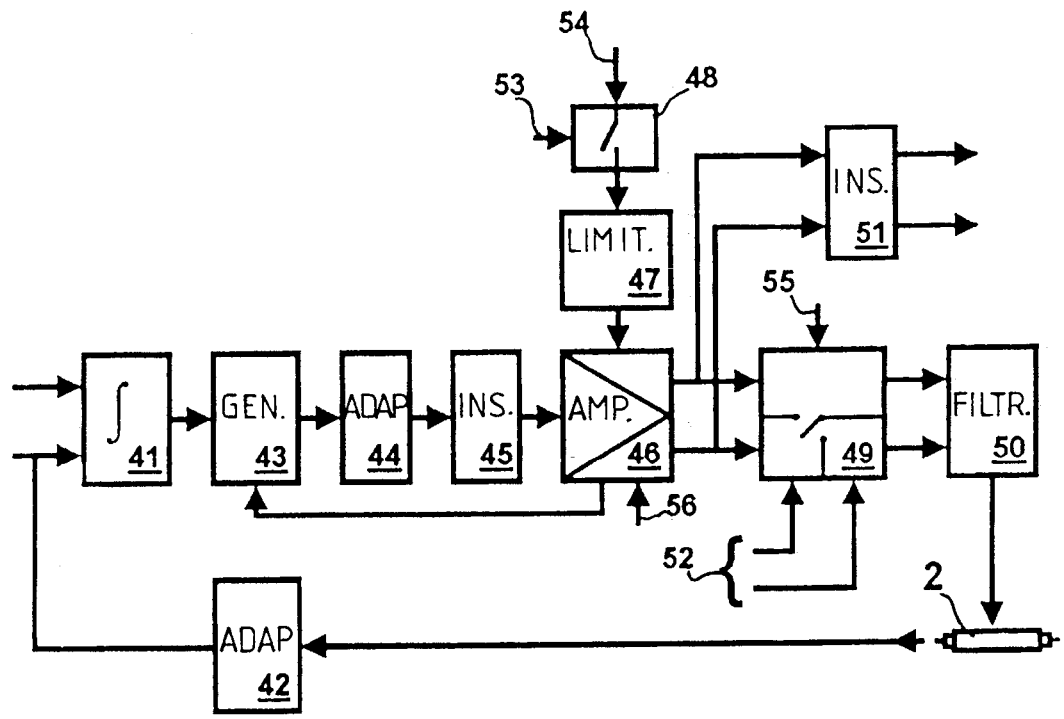

The circuit represented in FIG. 6 is part of the power control circuit 26 and enables the motor of the series thrustor 2 to be controlled with the instructions elaborated by the digital heart 20 and transformed into analog values by the I/O management circuit 27.

This circuit also receives, at input, the value of the position of the series thrustor 2 which transits beforehand via an adapting circuit 42.

The analog instruction and the value of the position of the thrustor are firstly added by a summing integrator 41 of which the resulting value drives a pulse generator 43.

The output signal of the pulse generator 43 passes through an adapting circuit 44, followed by a galvanic insulation, before being processed by a power amplifier with a H bridge 46.

The amplified value is then transmitted, via a relay 49 and an L filter 50, to the motor of the series thrustor 2.

The power amplifier 46 is powered by a 28-volt voltage 54 via a switching circuit 48 and a current limiter/breaker 47, and the signal it issues at output is transmitted to the digital heart 20 in order to be checked, via another galvanic insulating circuit 51.

Figure 7:
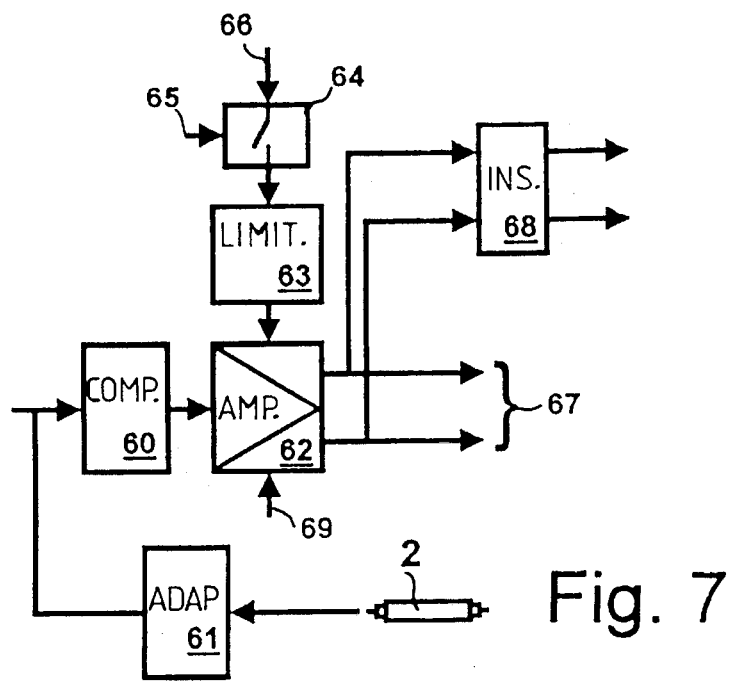

The relay 49 enables selection of the command to be transmitted to the motor of the series thrustor 2, from either the command issued by the amplifier 46 or another command 52 issued by the series thrustor recentering device, represented in FIG. 7, and situated either in the same computing module 10 or in another module of the computer.

The circuit in FIG. 7 is also part of the power control circuit 26, while being completely independent of the circuit previously described. It enables the recentering command of a series thrustor 2 to be generated.

For this purpose, it receives, at input, via an adapting circuit 61, the value of the position of this other series thrustor 2.

This position value is placed at input of a threshold comparator 60 which compares it with the neutral position. The result of this comparison is processed by another power amplifier with a H bridge 62, prior to transmission, on the one hand, to the relay 49 previously described (FIG. 6), and, on the other hand, to the digital heart 20 via a galvanic insulating circuit 68.

This power amplifier 62 is also supplied with a 28-volt voltage 66 via a switch 64 and a step-down transformer 63 which enables a limiting of the recentering speed of the series thrustor 2.

These two circuits (FIGS. 6 and 7) thus enable both the controlling of a series thrustor as a function of instructions elaborated by the digital heart 20, and the controlling of the automatic recentering of the series thrustor in the event of detection of an inconsistency.

Moreover, the recentering can be manually activated at all times by the relay 49 tripping command 55, the recentering command being furthermore continually produced by the other module.

Furthermore, the H-bridge power amplifiers 46 and 62 used in the control (FIG. 6) and recentering (FIG. 7) circuits can be manually inhibited either directly via the inputs 56 ad 69, or by transmission of a signal 53 and 65 to activate the power cut-off switch.

Figure 8:
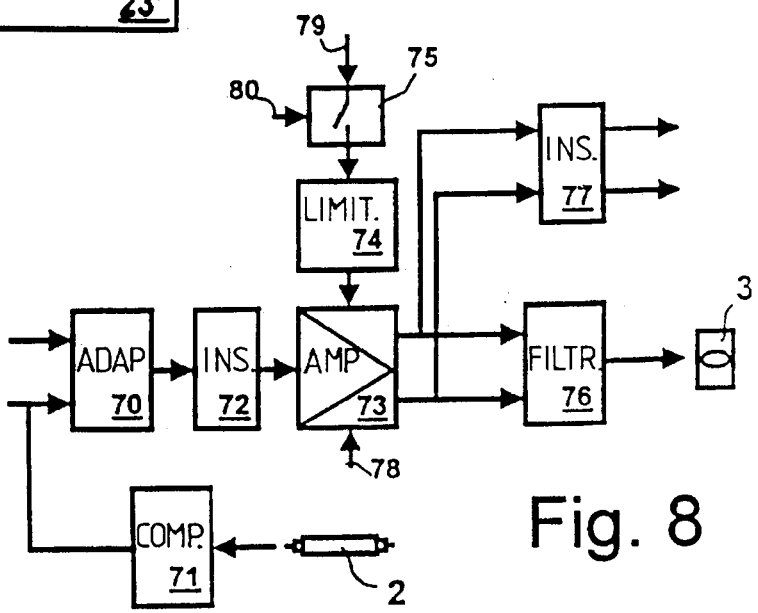
FIGS. 6 to 8 schematically represent the different parts of the power control circuit of the actuators.

FIG. 8 represents the circuit controlling the power to the motor of the trim thrustor 3 which is also part of the power control circuit 26. This circuit receives, at input, the pulsed commands generated by the digital heart which provide the direction and speed of rotation of the trim thrustor 3, and the logic commands generated by hardware 71 which indicate the direction of rotation of the trim thrustor.

This device 71 generates these directional commands by means of a threshold comparator, directly from the position of the associated series thrustor 2 to which it is connected. The position of the series thrustor 2 is thus compared with zero to produce, at output, a logic signal representative of the sign of the position of the series thrustor in relation to a central position.

It should be specified that the device 71 is completely independent of the digital heart. Moreover, it is connected to a series-thrustor (2) position sensor independent of the one used in generating the power command to this thrustor.

The pulsed and logic commands are transmitted, via an adapting stage 70 and a galvanic insulating stage 72, to a H-bridge amplifier 73.

Once amplified, these commands drive the motor of the trim thrustor via an L filter 76, and are transmitted to the digital heart 20 via a galvanic insulating circuit 77.

The power amplifier is supplied with a 28-volt voltage 79 independently of the rest of the power control circuit 26, via a switch 75 and a current limiter/breaker 74.

The trim thrustor command is thus protected in several ways.

Firstly, the power amplifier 73 is designed so as to only generate a trim thrustor command signal if the directional commands produced, on the one hand, by the digital heart 20, and, on the other hand, by the hardware device 71, indicate the same direction. If the directions indicated by these commands are different, the trim motor is not controlled and therefore remains inhibited.

This motor can also be inhibited by cutting the power supply to the power amplifier 73 by means of the switch 75 controlled by the signal 80, or by activating the amplifier inhibition command 78.

Furthermore, the power commands are galvanically insulated by the stage 77 and are transmitted to the digital heart 20 which can then check that the commands thus generated are consistent with the position of the series thrustor.

By way of these arrangements, the power control circuit as represented in FIG. 8 is completely independent of the rest of the power control circuit 26. Thus, a failure in the digital heart 20 or power control circuit of the series thrustor 2 systematically entails a blocking of the trim.

Figure 9:
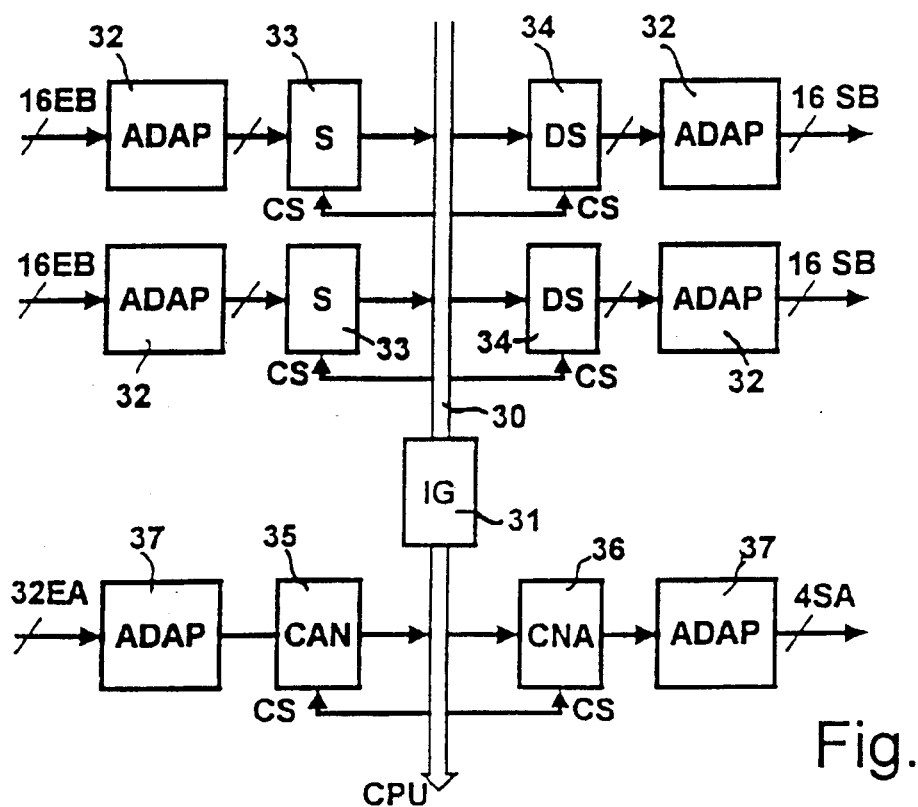
FIG. 9 shows an example of an I/O management circuit.

The I/O management circuit 27 represented in FIG. 9 comprises e.g. twice 16 Boolean data inputs and outputs, respectively 16EB and 16SB, 32 analog inputs 32EA and 4 analog outputs 4SA. The Boolean inputs are connected to a serializer 33 via an adapting circuit 32. This circuit also comprises a bus 30 connected to the digital heart 20 and via which transit the data at input and at output and channel selection signals CS. When one of the serializers 33 receives a signal CS from the digital heart 20, it transfers the data it receives in parallel form at input, in series form on the bus 30. In order to control the transfer of Boolean data to one of the outputs 16SB, for transmission to other equipment in the helicopter, the digital heart 20 selects one of the deserializers 34 by transmitting a signal CS to it, thereby causing transfer of the data on the bus 30 to the corresponding output 16SB in parallel form, via another adapting circuit 32.

The I/O management circuit 27 can also process analog data. For this purpose, it comprises an analog-to-digital converter 35 enabling transformation into digital values of the analog data at the input 32EA and passing through an adapting circuit 37. In order to receive these analog data, the digital heart 20 transmits, via the bus 30, a selection signal CS to this converter 35 which then transfers, in digital form on the bus 30, the analog data it receives at input.

The bus 30 comprises two parts insulated from one another by a galvanic insulating device 31 so as to separate the part managing the digital data from the part managing the analog signals.

In order to transmit analog data to the other equipment in the helicopter, the digital heart 20 selects the digital-to-analog converter 36 by sending it a signal CS. The data in transit on the bus 30 are then transformed into analog form and transmitted to the analog data output 4SA via an adapting circuit 37.

This circuit 27 also comprises a galvanic insulating circuit enabling the portion of the bus 30 in which the Boolean data are transiting to be insulated from the portion in which the analog data are in transit and which is connected to the digital heart 20.

From the description of the power control circuit 26 and I/O management circuit 27, it appears that these circuits can have a highly variable architecture from one computer configuration to another in order to adapt as finely as possible to the equipment in the helicopter. It is for this reason that they are advantageously arranged on one or two plug-in modules 23, 23', 23", the presence of the module 23' depending on the type of the actuators, with or without integrated power control, equipping the helicopter.

It should also be noted that the number of inputs and outputs the circuit 27 must comprise depends not only on the equipment in the helicopter and the functions performed by the digital heart, but also on the functions performed by the power control circuit 26.

It goes without saying that the connectors 24, 25 are adapted to all possible versions of these two circuits 26, 27 and therefore to all plug-in module configurations provided.

They therefore comprise multiple connection points which are not systematically all used in all configurations of the plug-in module. From this viewpoint, at the time of initializing the computer, the self-configuring function of the digital heart 20 advantageously comprises:

a means for determining the number and type (Boolean or analog) of the inputs and outputs managed by the plug-in module 23 or 23", a means for detecting the presence of the module 23' supporting the power control circuit, and a means for determining which power commands are performed by the power control circuit 26, i.e. a means for detecting the presence of the series thrustor 2 control circuit, the series thrustor 2 recentering control circuit, and trim thrustor 3 control circuit.

Moreover, in order to be capable of adapting to all the plug-in module configurations provided, the software controlling the digital heart 20 comprises all the functions required to control the plug-in module(s) 23, 23', 23" with the most complete configurations.

The hardware and software architecture thus presented enables very fine adaptation of the automatic piloting device to the flight characteristics of each helicopter and to the mission for which the latter is intended.

Figure 10:
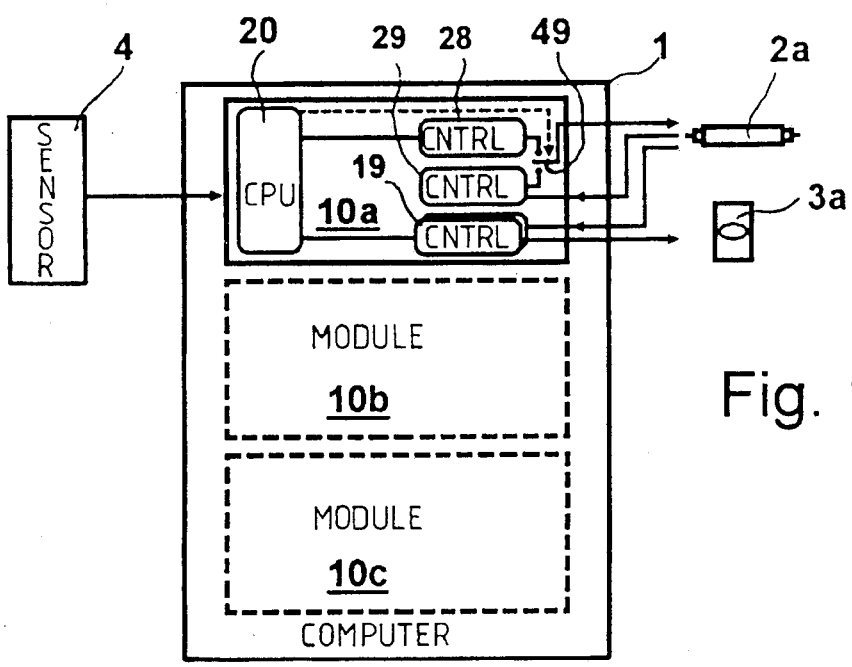
FIGS. 10 to 15 show different possible configurations of the device.

Thus, FIG. 10 shows a configuration of a computer 1 which enables the obtaining of an automatic piloting device on one single piloting axis, e.g. the yaw axis. For this purpose, the computer 1 need only comprise one single module 10a connected, on the one hand, to its own set of sensors 4, and, on the other hand, to its own actuators 2a, 3a.

As previously described, the module 10a notably comprises a series thrustor 2a command function 28, a trim thrustor 3a command function 19, and a digital heart 20 receiving notably the information from the sensors 4.

The series thrustor 2a has the particularity of being very fast, and in the event of failure in the command sequence, it can block itself almost instantaneously. The pilot has always, of course, the possibility of manually taking over control of the helicopter, but in the case of certain types of helicopters, the response time required of the pilot will be too short for the pilot to safely regain control of the aircraft.

In order to obviate this drawback, the module 10a comprises the monitoring and recentering function 29 of which the power control part is represented in FIG. 7. This monitoring function is designed to compare the command leaving the power amplifier 46 and galvanic insulating stage 51 with the instruction generated by the digital heart 20. If these two values are not consistent, the monitoring function activates automatic recentering of the series thrustor 2a, by controlling a tripping of the relay 49, and de-activates the module 10a which is then deemed faulty.

Figure 11:
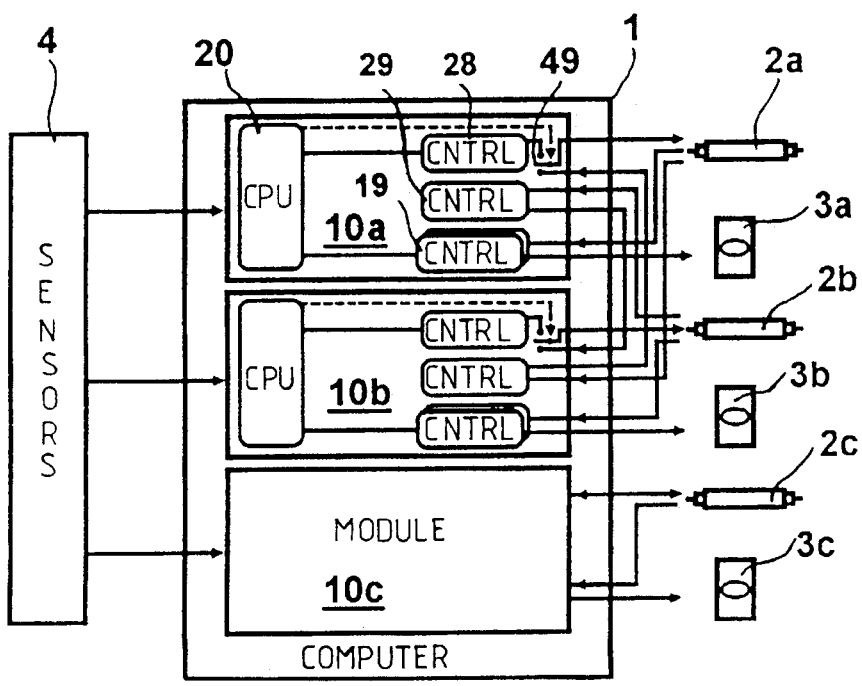

In FIG. 11, the computer 1 comprises three computing modules 10a, 10b, 10c which are connected on one side to a set of sensors 4 and to the helicopter cockpit. They enable direct controlling of the series thrustors 2a, 2b, 2c and trim thrustors 3a, 3b, 3c of the three piloting axes (roll, pitch and yaw) as a function of the information coming from the set of sensors 4 and the cockpit.

Each module 10a, 10b, 10c notably comprises a series thrustor 2a, 2b, 2b command function 28, a trim thrustor 3a, 3b, 3c command function 19, a selection function 20 for data from the set of sensors 4, pertaining to the axis it is piloting, and a series thrustor monitoring and recentering function 29.

The modules 10a and 10b dedicated respectively to the pitch and roll axes, for instance, can be interconnected by way of an external connector 5 so as to enable reciprocal control of the command sequences for the series thrustors 2a, 2b. To this end, the recentering control circuit of the module 10a is connected to the series thrustor 2b position sensor of the other module 10b, and the monitoring function of the module 10a can act on the relay 49 of the module 10b. Likewise, the monitoring and recentering function of the module 10b is connected to the module 10a and to the series thrustor 2a it controls. The monitoring function integrated into the digital heart 20 of each module 10a, 10b is designed to process the data from the sensors situated on the other axis. Thus, the modules 10a, 10b dedicated to the pitch and roll axes are connected to the same set of sensors 4. In this way, the sensor 4 selection function 19 selects the data from the sensors placed on the other axis in order to transmit them to the monitoring function 29. The latter then generates the series thrustor 2b, 2a command instruction of the other sequence and compares it with the value of the power command transmitted to the series thrustor 2b, 2a of the other module. If these two values are inconsistent, the monitoring function 29 interrupts the automatic piloting process of the thrustors 2a, 3a and controls a tripping of the relay 49 of the second module 10b by way of the command 55 to transmit, to the second series thrustor 2b, the recentering commands generated by the first module 10a, by means of the value of the position of the second series thrustor 2b.

As the thrustor 2a piloting process is interrupted, the digital heart 20 of the second module 2b monitoring the first module 2a will detect an inconsistency in the same way, which has the effect of interrupting the process of automatic piloting of the thrustors 2b, 3b, and of triggering a tripping of the relay 49 of the first module 2a in order to recenter the first thrustor 2a.

Moreover, the module 2c is connected, independently of the two other modules 2a, 2b, to its own actuators 2c, 3c. It ensues that the monitoring and recentering function 29 of this module 10c is not active.

Figure 12:
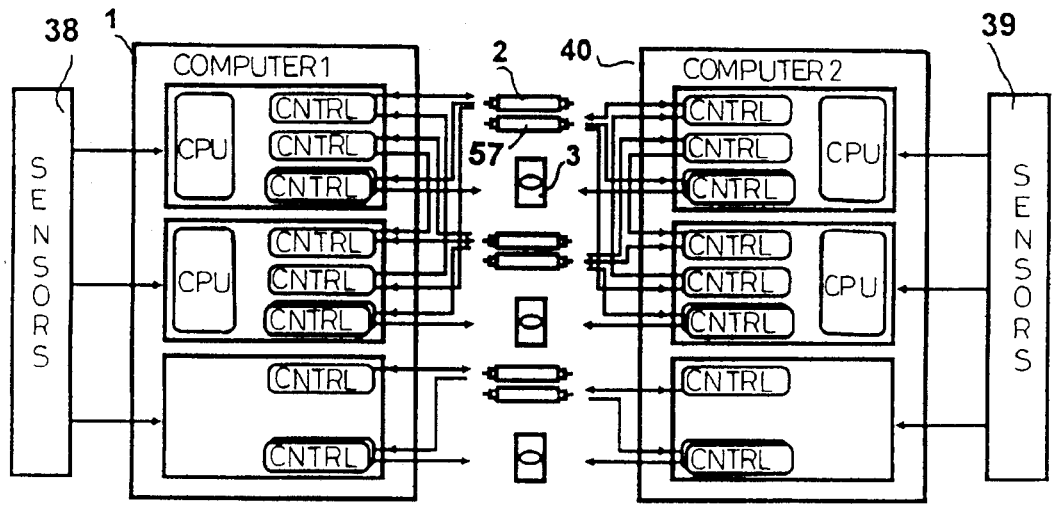

When safety restrictions imposed for the type and mission of the helicopter are very harsh, all the piloting axis command sequences can be doubled in order to avoid one of the piloting axes not being controlled due to failure (FIG. 12).

According to this configuration, the device thus comprises a second computer 40 configured in the same way as the computer 1, another set of sensors 39, and another series thrustor 41 placed in series with the thrustor 2, on each piloting axis. It should be noted that the role of the trim thrustors 3 is secondary in relation to that of the series thrustors 2, whence there being no need to double them.

In this manner, the two command sequences of an axis activate the same flight control surfaces, and if one of these two sequences is faulty, the other will continue to activate the flight control surfaces.

Figure 13:
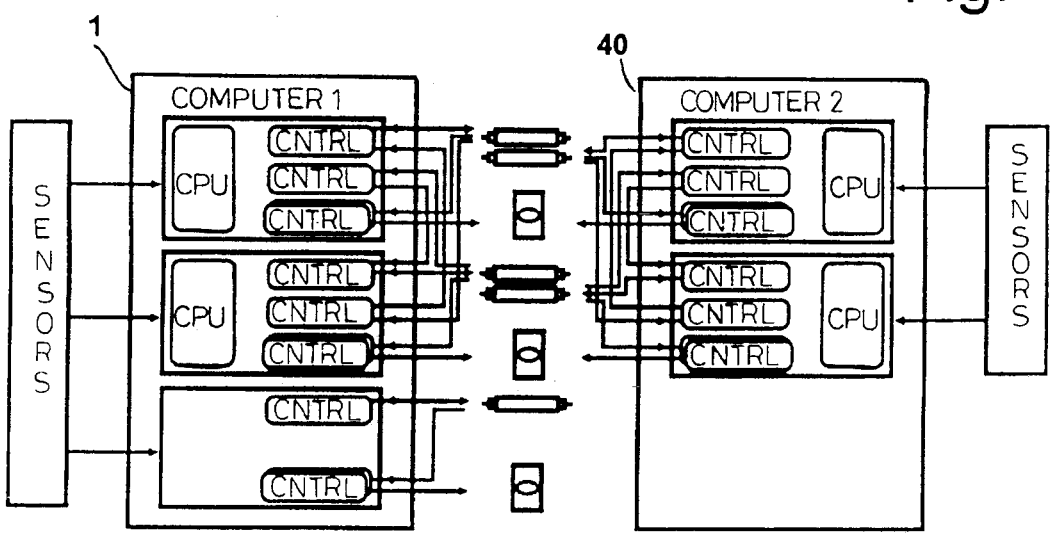

An intermediary solution is of course possible. Thus, in FIG. 13, the second computer 40 only comprises two modules which are respectively dedicated to the pitch axis and roll axis. This configuration provides considerable safety in relation to these two axes, and minimum safety for the yaw axis whose command sequence is not doubled.

As previously mentioned, the automatic piloting device can perform high-level piloting functions. For this purpose, the computer can be connected to a control box placed in the cockpit. These piloting functions concern the following:
maintaining of the aircraft at a constant altitude,
maintaining of the speed of the aircraft,
holding a course,
following of radio navigation markers, etc.

Figure 14:
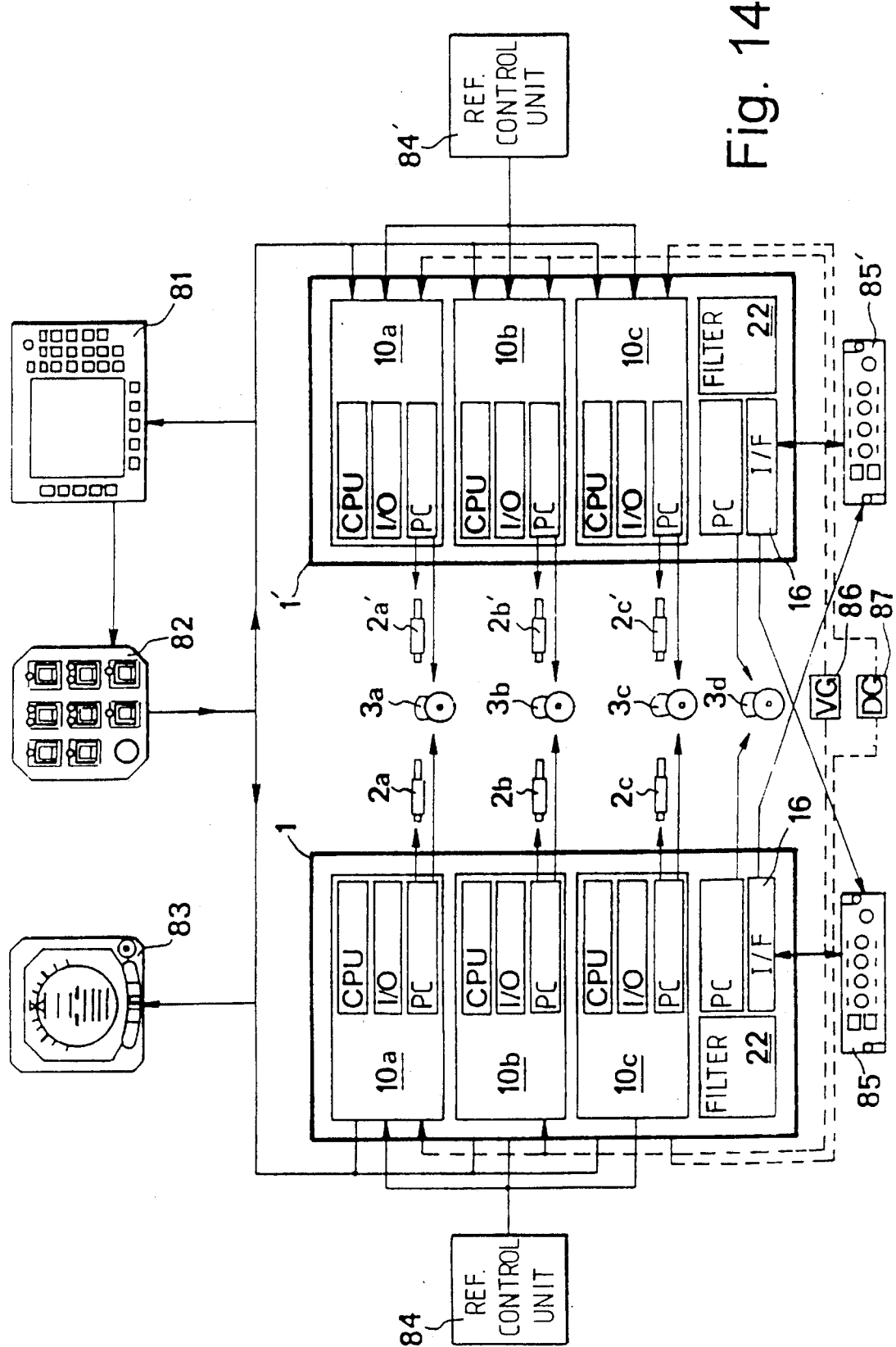

The automatic piloting device represented in FIG. 14 thus pilots according to four axes, i.e. the pitch, roll, yaw and collective axes, and in order to ensure a high level of operating safety, comprises two control surface command sequences per piloting axis.

To this end, this device comprises two computers 1 and 1', each equipped with three computing modules 10a, 10b, 10c for automatic piloting respectively according to the pitch, roll and yaw axes. Each of these piloting axes is equipped with two series thrustors 2a, 2a'–2b, 2b'–2c, 2c' mounted in series on the rods of the corresponding flight control surface, and with a trim thrustor 3a, 3b, 3c. The two series thrustors for each piloting axis are respectively controlled by the two computers 1, 1', while each trim thrustor is operated by the two computers.

The two computers 1, 1' receive, via a network using a particular protocol such as ARINC 429, information from:
a navigation computer 81,
a flight management computer ensuring piloting according to the instructions supplied by the navigation computer,
a flight indicator 83,
a respective horizontal reference and attitude control unit 84, 84', and
possibly a gyroscopic vertical attitude and directional reference 86, 87.

The computing modules 10a, 10b, 10c are each equipped with a digital heart "CPU", an I/O management module "I/O", and a power control module "CP". Furthermore, the computing modules of the two computers 1, 1' are interconnected so as to, on the one hand, control one of the two series thrustors, e.g. 2a, 2b, 2c and the trim thrustor 3a, 3b, 3c of the corresponding piloting axis, and, on the other hand, monitor the service quality of the command sequence of the other series thrustor 2a', 2b', 2c'. In this manner, in the event of inconsistency between the command sequences of the two series thrustors 2a, 2a' of a same piloting axis, these two series thrustors are automatically recentered, and the automatic piloting for the corresponding axis is de-activated.

Advantageously, the computers 1, 1' are equipped with a filtering and protection circuit to counter the effects of lightning and electromagnetic radiation 22, a board 16 interfacing with a cockpit 85, 85' and a power control module "CP" enabling activation of the trim thrustor 3d controlling the entire helicopter.

Figure 15:
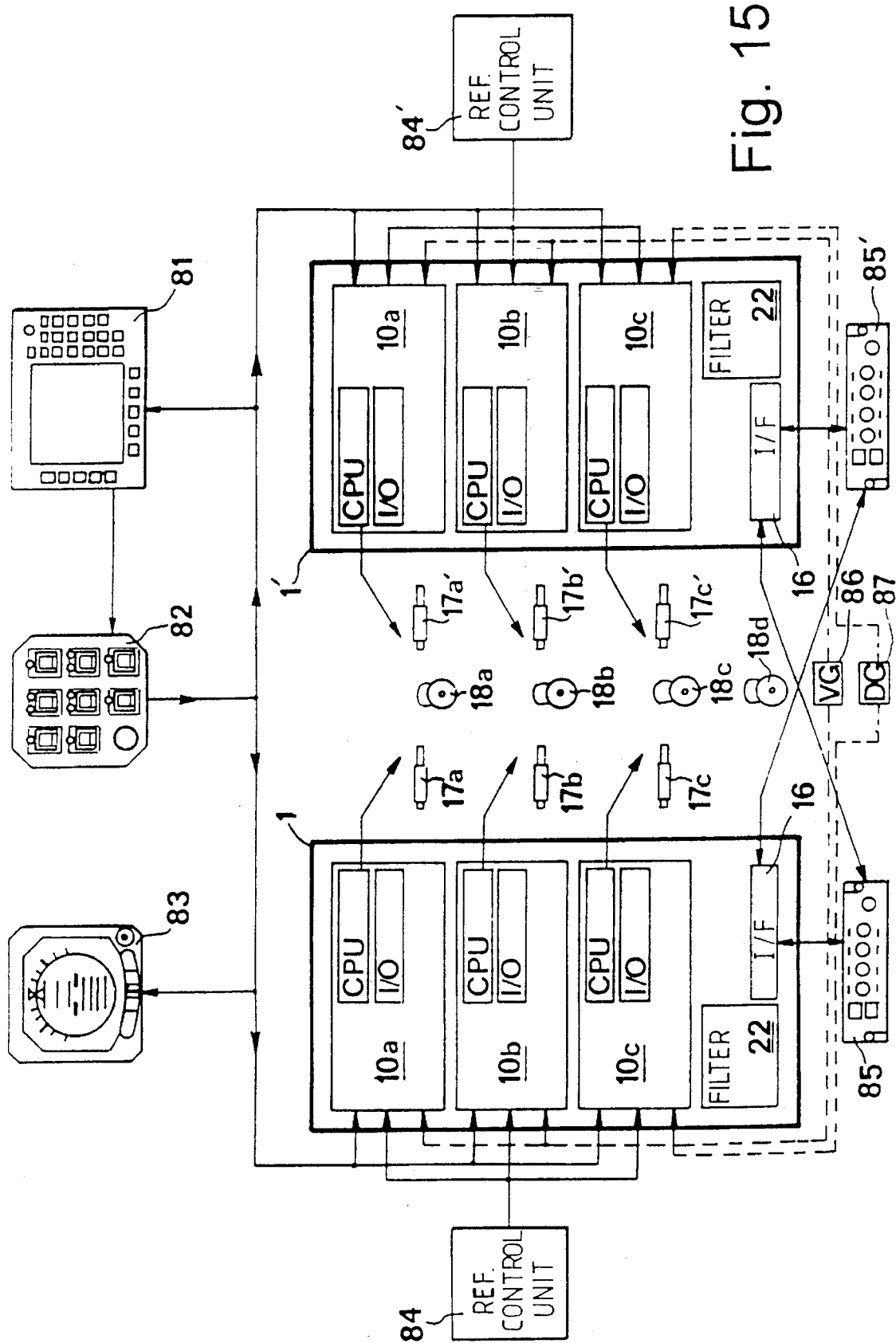

The configuration represented in FIG. 15 uses actuators of the series thrustor type 17a, 17a'–17b, 17b'–17c, 17c' and trim type 18a, 18b, 18c known as "intelligent", i.e. they are equipped with their own power control circuit. The computing modules 10a, 10b, 10c equipping the two computers 1, 1' do not therefore require a plug-in power circuit module, and all the connections of the two computers with the actuators and other equipment in the helicopter are made by the same network.

Thus, by way of the modularity of the computers 1, 1', the device in FIG. 12 can be significantly simplified while maintaining the same functionalities and same level of safety.

We claim:

1. An automatic piloting device for an aerodyne using at least one digital computer receiving information from a set of sensors and controlling actuators acting on flight control surfaces of said aerodyne, said computer comprising at least one autonomous Computing module having hardware and software resources comprising:

a means for controlling piloting of said aerodyne according to any one of three piloting axes (pitch, roll, yaw), means for determining the piloting axis for which said computing module controls piloting and for making said computing module specific to this piloting axis, means for monitoring the piloting of said aerodyne according to any one of the three piloting axis, and when a failure is detected, for disabling piloting according to the monitored piloting axis, and for recentering the actuators corresponding to the monitored piloting axis, and means for determining the monitored piloting axis.

2. An automatic piloting device for an aerodyne comprising at least one digital computer receiving information from sensors and controlling actuators acting on flight control surfaces of said aerodyne, said actuators corresponding to each piloting axis comprising a series thrustor and a trim thrustor enabling recentering of the position of said series thrustor, said computer comprising at least two identical autonomous computing modules each being connected to two sets of sensors and actuators corresponding respectively to two of three piloting axes (pitch, roll, yaw), each computing module having hardware and software resources comprising:

a series thrustor and trim thrustor command function for controlling piloting according to any one of said three piloting axes through the series thrustor and the trim thrustor corresponding to said piloting axis, a means for determining a controlled piloting axis corresponding to the actuators and sensors to which said computing module is connected and according to which said computing module controls piloting, and means for making said computing module specific to this controlled piloting axis, a series thrustor monitoring and recentering function for monitoring piloting of said aerodyne according to any one of said piloting axis, and when a failure is detected, for disabling piloting according to the monitored piloting axis and for recentering the series thrustor corresponding to the monitored piloting axis, and means for determining said monitored piloting axis according to which the other computing module performs piloting control, and corresponding to the actuators controlled by said other module, a digital heart comprising notably a microprocessor controlled by software so as to control piloting of said aerodyne according to any one of the piloting axes and to monitor piloting of said aerodyne according to any one of said piloting axes, a power control circuit for directly controlling the actuators corresponding to any one of said piloting axes, a feed circuit, an I/O management circuit, and a filtering and protection circuit for protection against the effects of lightning and electromagnetic radiation.

3. An automatic piloting device for an aerodyne comprising at least one digital computer receiving information from sensors and controlling actuators acting on flight control surfaces of said aerodyne, said computer comprising at least two autonomous computing modules connected to two respective sets of sensors and actuators corresponding respectively to two of three piloting axes (pitch, roll, yaw), each computing module having hardware and software resources comprising:

a means for controlling piloting of said aerodyne according to any one of said three piloting axes, and a means for determining the piloting axis according to which said computing module controls piloting and for making said computing module specific to this axis, at least a first one of said two computing modules being connected to the set of sensors and actuators connected to a second one of said two computing modules, said first computing module further comprising a means for monitoring piloting control performed by the second computing module, and when a failure is detected, for disconnecting said second computing module and for recentering the actuators controlled by said second computing module.

4. The device as claimed in claim 3, wherein said two modules are identical, and are each connected to the set of sensors and actuators of the other of said two modules so as to monitor piloting control performed by said other module, and when a failure is detected, to disconnect said other module and to recenter the actuators controlled by said other module.

5. An automatic piloting device for an aerodyne comprising at least one digital computer receiving information from sensors and controlling actuators acting on flight control surfaces for piloting said aerodyne according to at least one of three piloting axes (pitch, roll, yaw), said actuators corresponding to each piloting axis comprising a series thrustor and a trim thrustor enabling recentering of the position of said series thrustor, said computer comprising at least one autonomous computing module having hardware and software resources comprising:

a series thrustor and trim thrustor command function for controlling piloting according to any one of said three piloting axes through the series thrustor and the trim thrustor corresponding to said piloting axis, means for detecting the piloting axis for which said computing module controls piloting and for making said computing module Specific to this piloting axis, a series thrustor monitoring and recentering function for monitoring piloting of said aerodyne according to any one of said piloting axis, and when a failure is detected, for disabling piloting according to the monitored piloting axis and for recentering the series thrustor corresponding to the monitored piloting axis, and means for detecting the monitored piloting axis, 6. The device as claimed in claim 3, wherein each computing module comprises:

a digital heart comprising notably a microprocessor controlled by software so as to control piloting of said aerodyne according to any one of the piloting axes and to monitor piloting of said aerodyne according to any one of said piloting axes, a power control circuit for directly controlling the actuators corresponding to any one of said piloting axes, a feed circuit, an I/O management circuit, and a filtering and protection circuit for protection against the effects of lightning and electromagnetic radiation.

7. The device as claimed in claim 6, wherein each computing module comprises at least one plug-in module grouping together the I/O management circuit of said computing module, and the power control circuit.

8. The device as claimed in claim 6, wherein each computing module comprises a first plug-in module including said power control circuit, and a second plug-in module including said I/O management circuit of said computing module.

9. The device as claimed in claim 8, wherein each computing module further comprises:

a means for determining the number and respective types (Boolean or analog) of the inputs and outputs managed by said first plug-in module, a means for detecting the presence of said second plug-in module supporting said power control circuit, and a means for determining power commands which are performed by said power control circuit.

10. The device as claimed in claim 7, wherein said I/O management circuit of said plug-in module comprises a means for receiving and transmitting digital and analog data.

11. The device as claimed in claim 7, wherein the software controlling said digital heart comprises all functions required to control the plug-in module with a most complete configuration.

12. The device as claimed in claim 6, wherein said power control circuit of each computing module comprises a means for generating power commands for the actuators corresponding to the piloting axis according to which said computing module controls piloting, from instructions computed by the digital heart of said computing module by means of piloting laws concerning said piloting axis, and from position values of said actuators sent by said sensors.

13. The device as claimed in claim 2, wherein the digital heart of each of said two computing modules comprises a means for generating a first command to be applied to the series thrustor controlled by said other computing module, for comparing said first command with a second command applied by said other computing module to said series thrustor, and, when said first and second commands are inconsistent, for interrupting the piloting control performed by said other module, and for recentering said series thrustor controlled by said other module.

14. The device as claimed in claim 2, wherein said power control circuit of each computing module, controlling a first series thrustor, comprises a circuit permanently generating a recentering command of a second series thrustor, and a relay which applies to the first series thrustor the piloting command generated by said computing module and when a failure is detected the recentering command generated by said other module.

15. The device as claimed in claim 14, wherein the relay of a first of said two computing modules is controlled by the a second of said two computing modules.

16. The device as claimed in claim 4, wherein said two computing modules are interconnected by respective connectors so as to ensure reciprocal monitoring and recentering of series thrustors controlled respectively by said two computing modules.

17. The device as claimed in claim 4, further comprising two identical computers each comprising at least two computing modules controlling piloting respectively according to two piloting axes, two computing modules belonging respectively to said two computers controlling simultaneously the piloting according to a same piloting axis through a trim thrustor and respectively two series thrustors mounted in series, according to information from two respective sets of sensors.

18. The device as claimed in claim 1, further comprising a means for defining an identification code specific to each piloting axis, each computing module comprising a means for reading said identification code, in order to configure itself as a function of the axis according to which it controls piloting of said aerodyne, and as a function of the axis according to which it monitors piloting of said aerodyne.

* * * * *